United States Patent [19]

Mobley

[11] Patent Number: 5,065,921
[45] Date of Patent: Nov. 19, 1991

[54] BICYCLE RACK FOR MOUNTING ON A VAN

[76] Inventor: Mark H. Mobley, P.O. Box 636, Norris, Tenn. 37828

[21] Appl. No.: 436,492

[22] Filed: Nov. 14, 1989

[51] Int. Cl.⁵ ................................................. B60R 9/00
[52] U.S. Cl. .............................. 224/324; 224/42.03 B; 224/329
[58] Field of Search ............... 224/329, 337, 324, 315, 224/309, 42.03 B; 211/17, 18, 19, 22

[56] References Cited

U.S. PATENT DOCUMENTS

| | | | |
|---|---|---|---|
| 3,464,608 | 9/1969 | Rodriguez | 224/42.03 B |
| 3,752,375 | 8/1973 | Weigl | 224/324 |
| 3,901,421 | 8/1975 | Kalicki et al. | 224/324 |
| 4,085,874 | 4/1978 | Graber | 224/42.03 B |
| 4,290,540 | 9/1981 | Allen | 224/42.03 B |
| 4,842,148 | 6/1989 | Bowman | 211/18 |

FOREIGN PATENT DOCUMENTS 2383806  10/1978  France ................................ 224/309

*Primary Examiner*—Linda J. Sholl

[57] ABSTRACT

A bicycle rack assembly for carrying up to four bicycles comprising a fork support with a simulated wheel axle attached to a tubular bar having four legs. The rack is specifically designed to be utilized on vans or similar vehicles. The assembly is secured to the rear of a van by an upper pair of adjustable straps attached to the lip or edge of the van door or hatch and a lower pair of adjustable straps which are attached to either the lower edge of the door or the bumper. To use, the front wheel of the bicycle is removed; and its front fork is attached to the simulated wheel axle. The bicycle is held vertically with its rear wheel resting against the rear bumper of the van. In this position, the bicycle is out of the air stream of the vehicle. Moreover, since the rear wheel is close to the ground, the bicycle can be easily mounted on the rack or removed from it. For additional security, a safety strap is also provided to be fitted around each bicycle and attached to the rack.

3 Claims, 2 Drawing Sheets

BICYCLE RACK FOR MOUNTING ON A VAN

BACKGROUND OF THE INVENTION

1. Field of the Invention

The present invention relates to carriers mounted on vehicles for transporting one or more bicycles.

2. Description of the Prior Art

Of the many U.S. patents on bicycle racks mounted on vehicles, most of these racks were designed for use on the trunks or bumpers of cars. Wasserman, U.S. Pat. No. 3,874,575, disclosed such a rack in 1975 while Allen, U.S. Pat. Nos. 4,109,839 and 4,709,840, disclosed trunk mounted bicycle racks in 1978 and 1987. Both Wassermann's and Allen's devices used adjustable straps but were best suited for use on the trunk of the vehicle. Other bicycle racks have been designed for mounting on the roof of the vehicle. Among them, are racks in which, during loading, the front wheel of the bicycle is removed and the front fork secured to the rack using a fixed axle. Carter, U.S. Pat. No. 3,828,993, and Shimano U.S. Pat. No. 3,848,784 both disclose bicycle racks using such a front fork mount, but both of these racks are only suitable for mounting on the roof of the vehicle. Bicycles carried on the roof of a vehicle add significantly to the air drag and therefore reduce gas milage. Roof mounted racks are inconvenient in that the rack connections are high and mostly out of reach on vans and similar vehicles.

In 1975, both Danon, U.S. Pat. No. 3,927,810 and Rogers, U.S. Pat. No. 3,921,869 disclosed bicycle racks that were fastened to the nearly vertical surfaces of the rear doors of vans and similar vehicles. The bicycle rack disclosed in the Danon patent is similar to most of the trunk mounted racks in that the bicycles are supported horizontally on two brackets that extend outward from the rack underneath the top tube of the bicycle frames. Typically, only two or three bicycles can be carried in this manner. Furthermore, damage to the bicycles is hard to avoid because there are no provisions to separate them.

The bicycle rack disclosed by Rogers, on the other hand, positions the bicycles vertically allowing several bicycles to be carried on the rack. Rogers' rack engages the handlebars of the bicycles with the seat resting on an intermediate support and the wheels extending away from the vehicle. The loading and unloading of any bicycle mounted on Rogers' device is awkward because the handle bars, the most convenient place to handle a bicycle, must be turned toward the vehicle leaving the freemoving wheels and greasy chain nearest the user. Moreover, the rack assembly itself is a large and cumbersome structure that comprises many parts. Further, while both Danon's and Rogers' devices hold totally assembled bicycles, both devices require additional straps and tie-downs to hold the bicycles securely.

In 1989, Bowman, U.S. Pat. No. 4,842,148 disclosed a bicycle rack that also uses a front fork mount. The usefulness of this rack is limited. Bowman's rack was specifically designed for stationary use, as on a wall, with permanent bolted connections. There is no means for adjustably attaching the rack to a vehicle. The rack has provisions for only one bicycle.

OBJECTS AND ADVANTAGES OF THE INVENTION

The object of the present invention is to provide a low cost bicycle-carrying rack that is easily mounted on vehicles that have high roofs and nearly vertical rear doors such as vans or the like.

A further object of the present invention is to provide means for carrying at least one bicycle on such vehicles with the bicycle held securely and out of the air stream of the vehicle.

A still further object of the present invention is to provide a rack for such vehicles on which up to four bicycles can be easily mounted and removed.

Other objects and advantages of the present invention will become apparent when the invention is considered in its preferred form as is disclosed in the accompanying figures and descriptions.

In accordance with the present invention, a bicycle rack comprises a horizontally mounted bar or tube to which is adjustably attached at least one bicycle fork mount assembly having a quick release clamping mechanism. When more than one such assembly is present, the fork mount assemblies are spaced apart from each other along the tube. Supporting the tube are two pairs of legs. Each pair defines a generally C-shaped structure which is adapted to contact the vehicle. The feet on the ends of the C-shaped structures are cushioned to protect the finish of the carrying vehicle. The assembly is held in position by upper and lower straps, both of which are adjustable in length. One end of each of the straps are attached to the bicycle rack frame using an adapter. The hooks on the opposite end of the upper straps are fastened to the upper edge of the rear door while hooks on the lower straps are fastened to the bottom of the door edge or to the bumper. The lengths of the upper straps are adjusted so that when a bicycle is mounted on the rack, the rear wheel of the bicycle will rest on the rear bumper of the carrying vehicle. The lower straps are then tightened to hold the rack securely to the rear door of the vehicle. The bicycle rack thus described is simple, easily constructed and not difficult to mount on the vehicle. All of the connections and adjustments are easily within reach of the user standing behind the vehicle.

In loading the device, the front wheel of the bicycle is removed and its front end pivoted upward using the handle bars. The bicycle is then raised so that the bicycle fork can be placed on the fork mount assembly with the rear wheel of the bicycle directly below. The bicycle is then held in place with one hand and the clamping mechanism closed with the other. The fork mount assembly includes a quick release clamping mechanism that makes the rack easy to use and provides a secure attachment. For additional security, a safety strap can be fastened around the bicycle and attached to the rack.

In the mounted position, the front fork of the bicycle is nearly directly above its rear wheel. The rear wheel of the bicycle is situated at the height of the bumper and rests against it. As a consequence, the bicycle needs to be raised less than two feet off of the ground, thereby making the rack easy to load and unload.

Furthermore, the bicycle so mounted is nearly completely out of the air stream of the vehicle and does not add additional drag, thereby saving gasoline.

When multiple bikes are to be mounted, the spacing of the fork mount assemblies can be adjusted to prevent interference between the protruding parts of the individual bicycles. This adjustment allows convenient and efficient mounting of up to four bicycles on a rack that is no wider than a typical vehicle.

Figure 1:
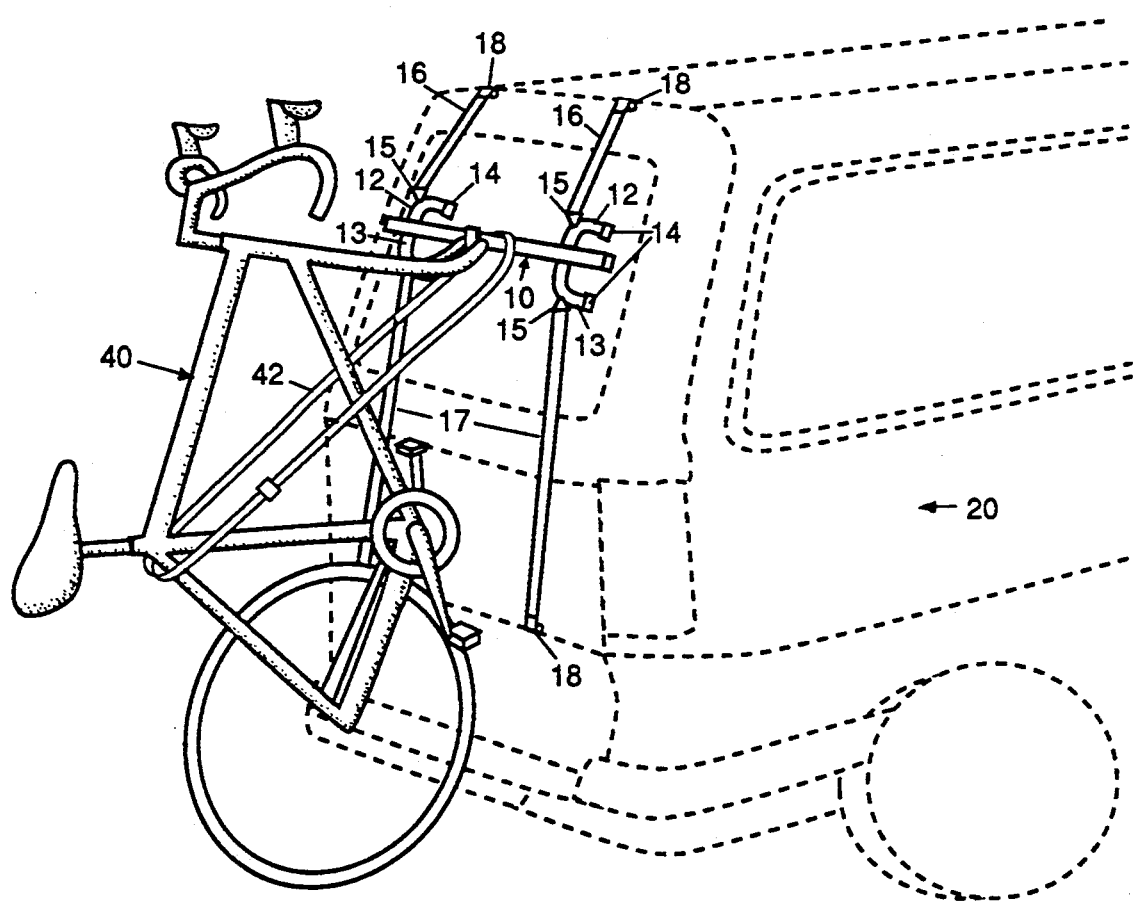
FIG. 1 is a perspective view of the bicycle rack assembly according to the present invention mounted on the rear door of a typical van with one bicycle mounted on it.

LIST OF REFERENCE NUMERALS 10 bicycle rack assembly
11 elongated tube
12 upper legs
13 lower legs
14 resilient foot pads
15 strap adapter
16 adjustable upper straps
17 adjustable lower straps
18 hook
20 vehicle
30 fork mount assembly
31 fork mount axle
32 quick release clamping mechanism
33 attachment bolts for fork mount assembly
40 bicycle
42 safety strap

DESCRIPTION OF THE INVENTION

The description set forth herein is directed to the details of the invention in its preferred form. The present invention is a bicycle carrying rack for mounting on the rear portion of a van or similar vehicle.

Figure 2:
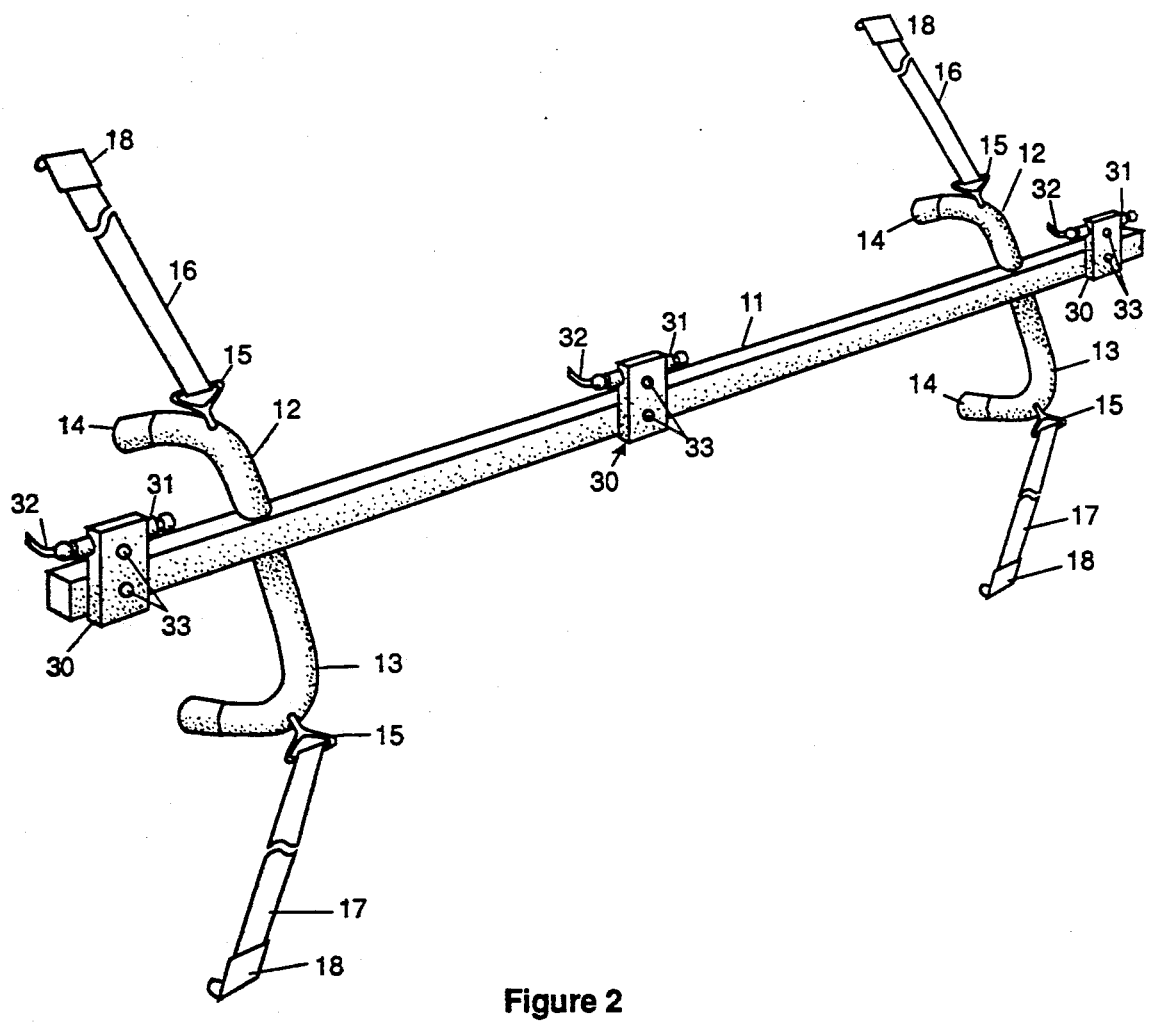
FIG. 2 is a perspective view of the bicycle rack assembly invention according to FIG. 1.

Referring to the drawings, the bicycle rack assembly, indicated in FIG. 1 generally by the reference number 10, includes an elongated tube 11 that is held away from the supporting vehicle 20 by two pairs of legs 12, and 13 that are rigidly fastened to the tube 11. Each of the pairs of legs 12, and 13 is bent at an angle of approximately 90 degrees. As illustrated in FIG. 2, a strap adapter 15 is connected to each leg 12, and 13 near the mid-section of this bend. Attached to the adapters 15 are adjustable straps 16, and 17. A hook 18 is attached to the end of each strap 16, and 17 distal the adapter 15 so that the strap can be fastened to the edge of the door or to the bumper of the vehicle 20. The leg pairs 12, and 13 are also equipped with foot pads 14 to prevent sliding of the rack 10 and to protect the finish of the vehicle 20.

The rack 10 further comprises means for attaching the front fork of a bicycle to the tube 11. The attaching means includes a fork support assembly 30. As shown in FIG. 2, the assembly 30 has an axle 31 with a quick release clamping mechanism 32 for holding the front fork of the bicycle 40. An assembly 30, such as model no. 39-1033 from Performance Bicycle Shop, Inc. located in Chapel Hill, N.C. may be used in the preferred embodiment. Each assembly is clamped to the tube 11 by the use of bolts 33. Up to four assemblies 30 can be spaced along the tube 11 and utilized to carry from one to four bicycles.

DESCRIPTION OF THE OPERATION OF THE INVENTION

As shown in FIG. 1, the rack 10 is attached to the vehicle 20 first by hanging the upper two straps 16 by their hooks 18 from the upper edge of the rear door or rain gutter of the van 20 and adjusting the length of the straps to obtain the desired height. Then the lower two straps 17 are hooked onto the bottom of the door or hatch or to the bumper and tightened securely by adjusting the lengths of the straps 17. Next the front wheel of bicycle 40 is removed, its fork is placed on the axle 31, and the quick release clamping mechanism 32 is tightened.

For added protection, a safety strap 42 is provided. As illustrated in FIG. 1, the safety strap is preferably secured around tube 11 and the frame of bicycle 40, near its seat location.

CONCLUSION AND SCOPE OF THE INVENTION

It is apparent from the foregoing that a new and improved apparatus for use in mounting bicycles on vans and the like has been provided. While only the presently preferred embodiment of the invention has been disclosed, as will be apparent to those familiar with the art, certain changes and modifications can be made without departing from the scope of the invention as defined by the following claims.

It is claimed:

1. A rack assembly for mounting at least one bicycle on a vehicle with a substantially vertical rear exterior wall, a rear bumper and having a width, said rack assembly comprising:
   (a) an elongated bar having first and second ends and sized to extend substantially the width of the vehicle;
   (b) two pair of support legs attached to the elongated bar at points spaced away from said first and second ends, each pair of support legs forming a generally c-shaped structure when the rack assembly is viewed from its side; said elongated bar and two pairs of support legs forming an elongated structure;
   (c) means for adjustably attaching the elongated structure to said rear exterior wall; and
   (d) a plurality of quick release clamping mechanisms mechanisms being positioned between one of the first and second ends of the elongated bar and one pair of support legs; said rack assembly having only a single elongated bar and structured such that the rack assembly is capable of being positioned on the vehicle to allow the bicycle fork to engage the quick release clamping mechanism and a rear tire of the bicycle to engage the rear bumper of the vehicle.

2. A rack assembly according to claim 1 wherein the means for adjustably attaching the elongated structure to said exterior wall consists of a plurality of flexible straps, one end of each strap being attached to the elongated structure.

3. A rack assembly according to claim 1 that further comprises a safety strap and means for securing the safety strap so that if said front fork attaching means fails, the bicycle remains attached to said vehicle.

* * * * *